(12) United States Patent
West

(10) Patent No.: US 7,958,045 B2
(45) Date of Patent: Jun. 7, 2011

(54) SYSTEM AND METHOD FOR GRAPHICALLY DISPLAYING MARKET RELATED DATA USING FIXED SIZE BARS

(75) Inventor: Robert A. West, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 12/860,306

(22) Filed: Aug. 20, 2010

(65) Prior Publication Data

US 2010/0318458 A1 Dec. 16, 2010

Related U.S. Application Data

(63) Continuation of application No. 11/415,344, filed on May 1, 2006, now Pat. No. 7,801,800, which is a continuation of application No. 10/785,816, filed on Feb. 24, 2004, now Pat. No. 7,792,741.

(51) Int. Cl.
*G06Q 40/00* (2006.01)
(52) U.S. Cl. ........................................................ 705/37
(58) Field of Classification Search .................. 705/35, 705/37
See application file for complete search history.

(56) References Cited

U.S. PATENT DOCUMENTS

| 5,347,452 | A | 9/1994 | Bay, Jr. |
| 6,272,474 | B1 | 8/2001 | Garcia |
| 6,772,132 | B1 | 8/2004 | Kemp, II et al. |
| 7,127,424 | B2 | 10/2006 | Kemp, II et al. |
| 7,228,289 | B2 | 6/2007 | Brumfield et al. |
| 7,389,268 | B1 | 6/2008 | Kemp, II et al. |
| 7,401,038 | B2 * | 7/2008 | Masuda ........................ 705/35 |

* cited by examiner

*Primary Examiner* — Ojo O Oyebisi
(74) *Attorney, Agent, or Firm* — McDonnell Boehnen Hulbert & Berghoff LLP

(57) ABSTRACT

A system and method are provided for displaying market related data, such as traded volume at each price level, or any other trader-selected values, using one or more fixed size bars. In one preferred embodiment, a graphical display interface is provided and includes a plurality of fixed size bars that display traded volume at different price levels. In such an embodiment, the length of each bar may correspond to a predefined maximum value, and each bar may be progressively color-coded using a first graphical format to represent traded volume that is lower than the maximum value. If the traded volume exceeds the maximum value, the overflow value may be represented by progressively color-coding the bar using a second graphical format that may be used in relation to the first graphical format color-coding.

33 Claims, 7 Drawing Sheets

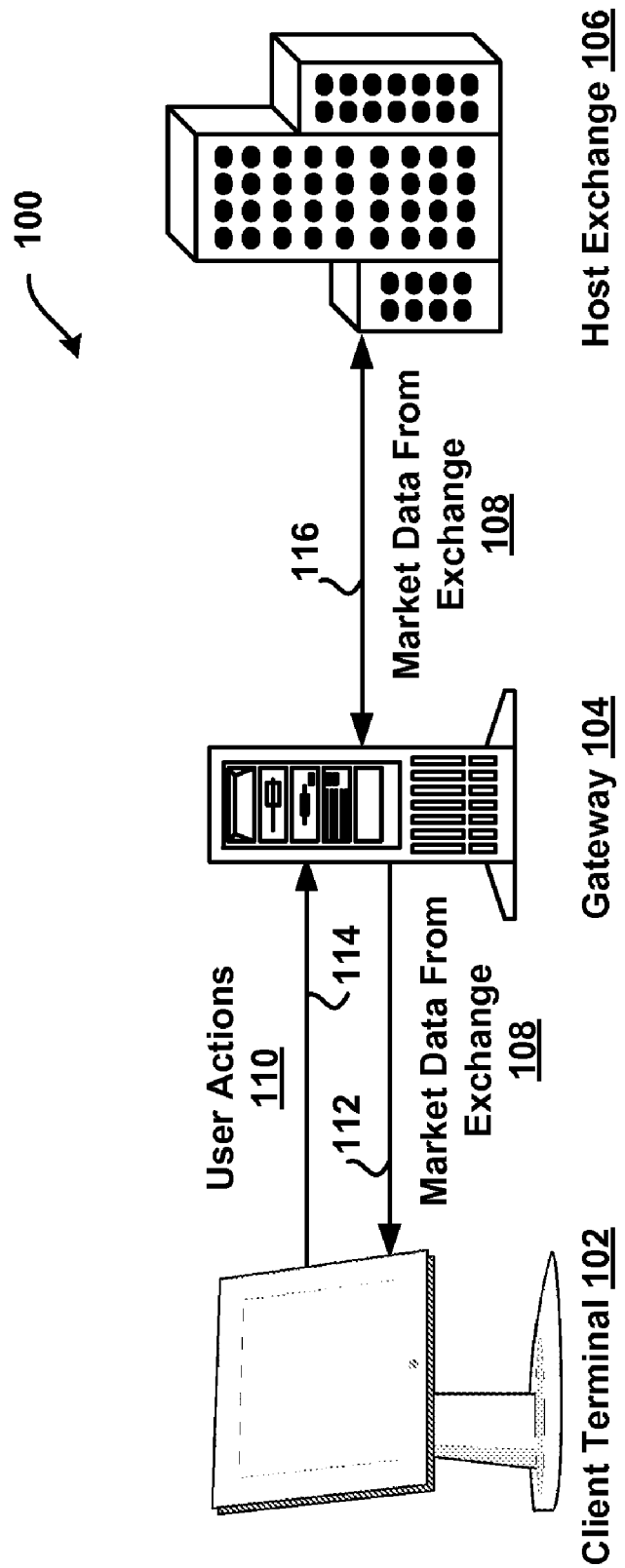

FIG. 2A (Prior Art)

| E/W | Bid Q | Ask Q | Prc |
|---|---|---|---|
|  |  | 15 | 145 |
|  |  |  | 144 |
|  |  | 35 | 143 |
|  |  | 100 | 142 |
|  |  | 75 | 141 |
|  | 120 |  | 140 |
|  | 125 |  | 139 |
|  | 20 |  | 138 |
|  |  |  | 137 |

- 202: E/W
- 204: Bid Q
- 206: Ask Q
- 208: Prc
- 210A: 25
- 212A: 50
- 214A: 100
- 216A: 75

FIG. 2B (Prior Art)

| E/W | Bid Q | Ask Q | Prc |
|---|---|---|---|
|  |  | 38 | 145 |
|  |  | 35 | 144 |
|  |  | 45 | 143 |
|  |  | 125 | 142 |
|  |  | 85 | 141 |
|  | 20 |  | 140 |
|  | 125 |  | 139 |
|  | 30 |  | 138 |
|  |  |  | 137 |

- 202: E/W
- 204: Bid Q
- 206: Ask Q
- 208: Prc
- 210B: 25
- 212B: 50
- 214B: 200
- 216B: 75

SYSTEM AND METHOD FOR GRAPHICALLY DISPLAYING MARKET RELATED DATA USING FIXED SIZE BARS

CROSS REFERENCE TO RELATED APPLICATIONS

This application is a continuation of U.S. patent application Ser. No. 11/415,344, filed May 1, 2006, now U.S. Pat. No. 7,801,800, entitled "System and Method for Graphically Displaying Market Related Data Using Fixed Size Bars," which is a continuation of U.S. patent application Ser. No. 10/785,816, filed Feb. 24, 2004, now U.S. Pat. No. 7,792,741, entitled "System and Method for Graphically Displaying Market Related Data Using Fixed Size Bars," the contents of which are fully incorporated herein by reference.

FIELD OF INVENTION

The present invention is directed towards electronic trading. More specifically, the present invention relates to a system and method for displaying market and trader related data, such as traded volume related information, using fixed size bars.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. Examples of tradeable objects may include, but are not limited to, all types of traded events, goods, and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

When a trader selects a tradeable object, traders may access market data related to the selected tradeable object(s). Referring to FIG. 1, an example communication that might occur between an electronic exchange and a client terminal in accordance with the preferred embodiments is shown. During a trading session, market data 108 in the form of messages may be relayed from a host exchange 106 over communication links 116 and 112 to a client terminal generally indicated as 102. As illustrated in FIG. 1, intermediate devices, such as gateway(s) 104 may be used to facilitate communications between the client terminal 102 and the host exchange 106.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available in the market at certain buy price levels and quantities available in the market at certain sell price levels.

In addition to providing the tradeable object's order book information, electronic exchanges can offer different types of market information such as total traded quantity for each price level, last traded price, last traded quantity, or order fill information. Typically, a trader may view the information provided from an exchange via one or more specialized trading screens created by software running on the client terminal 102. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken, generally shown at 110. It should be understood that different types of messages or order types can be submitted to the host exchange 106, all of which may be considered various types of transaction information. Once generated, user action messages 110 may be sent from the client terminal 102 to the host exchange over communication links 114 and 116.

To profit in electronic markets, market participants must be able to assimilate large amounts of data in order to recognize market trends and to view current market conditions. Among many different market data types, a trading screen on the client terminal 102 may display volume that has been traded for a tradeable object at different price levels during a trading day, often referred to as volume at price. In the embodiment illustrated in FIG. 1, the client terminal 102 or the gateway 104 may receive market updates from the host exchange 106, and may use the information provided in the updates to calculate the traded volume for each price level. Alternatively, the traded volume may be calculated at the host exchange 106 and may be sent to the client terminal 102 in market data updates. Once the traded volume is calculated and received at the client terminal 102, the traded volume data may be displayed via a trading screen on the client terminal 102. To illustrate this further, FIGS. 2A and 2B show a type of graphical user interface that may be used to display traded volume related data.

FIG. 2A shows a graphical interface 200A that can be displayed on a trading screen of the client terminal 102 to show traded volume related information in relation to the market's order book related data. In particular, the interface 200A shows aggregate buy and sell orders that are currently in the market, as illustrated in columns 204 and 206. The buy and sell order quantities are shown in relation to prices displayed in a price column 208. For instance, the best bid is for a quantity of 120 at a price of 140, and the best ask is for a quantity of 75 at a price of 141. Other bids and asks are shown for illustrative purposes. The interface 200A also shows graphical representation of traded volume related information for different price levels. In the embodiment illustrated in FIG. 2A, the traded volume is displayed using a bar chart including a horizontal bar at each price level. The graphical interface 200A illustrates four bars 210A-216A corresponding to traded volume of 25, 50, 100, and 75, respectively, at four price levels 142-139. In the illustrated embodiment, the maximum length of the longest bar, the bar corresponding to the quantity of 100 in this example, may correspond to the highest traded volume value, and the length of other bars may be automatically adjusted when the highest traded volume value changes. Therefore, in other words, the longest bar corresponds to the highest traded volume, and, as the traded volume corresponding to the longest bar increases, the other bars are auto-scaled to represent its traded volumes as percentages of the highest traded volume.

FIG. 2B shows the same interface of FIG. 2A upon detecting a change in a value of the highest traded volume. More specifically, the traded volume at the price of 140 has changed from 100 to 200, while the maximum length of the bar 214B remained constant compared to the bar 214A. Consequently, even thought the traded volume values at the price levels, other than 140, have not changed, the lengths of the bars 210B, 212B, and 216B, have been adjusted based on the new maximum traded volume value corresponding to the bar 214B. Since the length of the bars can change even when a traded volume value at a specific price level does not, such implementation may be confusing to a trader who wishes to monitor traded volume values at different price levels. In a different embodiment, a trader could be given the ability to manually rescale the displayed bars, such as to make one or more bars longer, for example, to plot the progressively increasing traded volume. However, such a method could also turn out very burdensome to a trader, forcing the trader to focus his attention on monitoring the traded volume and then, responsively, rescaling the bars to view the desired information. It is therefore desirable to offer user-friendly tools that can assist a market participant in making desirable trades while reducing the risks associated with misreading market information provided to a trader.

BRIEF DESCRIPTION OF THE DRAWINGS

Example embodiments of the present invention are described herein with reference to the following drawings, in which:

FIG. 1 is a block diagram that illustrates an example network configuration for a communication system utilized to access one or more exchanges;

FIGS. 2A and 2B are block diagrams illustrating a graphical interface for displaying market related information, and further displaying total traded volume values controlled by a conventional method;

DETAILED DESCRIPTION

Figure 3:
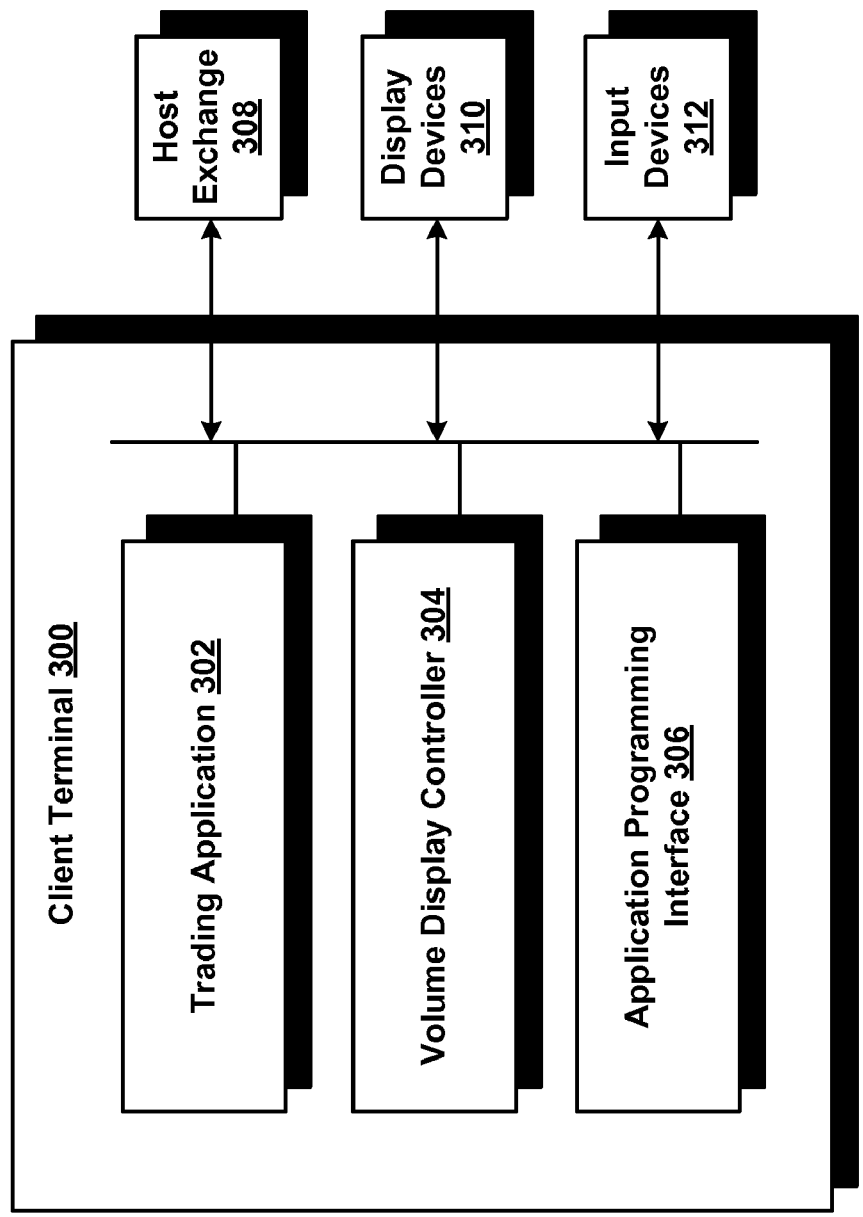
FIG. 3 is a block diagram illustrating an example client terminal that can be used to carry out the embodiments of the present invention.

I. Volume Representation Using Fixed Size Bars

The present invention includes methods, systems, and graphical interfaces that provide tools to be used by a trader for electronic trading. By using preferred embodiments, a trader is provided tools that can assist the trader in effectively monitoring market activity.

In one preferred embodiment, a graphical display uses a fixed size scale as a reference to display market related or any trader related values, such traded volume, market depth, trader's profit/loss data, or any other data that can be calculated based on market updates being received from an electronic exchange or data received from other sources. More specifically, according to one example embodiment, a display may include a fixed size bar chart including a plurality of fixed size bars displayed in relation to a plurality of price levels, and the length of each fixed size bar corresponds to a preset maximum value. In one example embodiment, each bar may be progressively color-coded to represent, for example, traded volume at the respective price level. Preferably, when the traded volume exceeds the preset maximum value corresponding to the length of the bar, the overflow volume may be represented using a second graphical format. For example, a portion of the bar may be highlighted using a different color than the one used to represent the maximum traded quantity. It should be understood, and as will be described in greater detail hereinafter, the first and second graphical formats can be illustrated using many different indicator types, such as two or more indicators moving across the bar, where an indicator type and a position of the indicator in relation to the bar may be used by a trader to determine when the traded volume crosses multiples of the maximum value associated with the length of the fixed size bar.

Also, it should be understood that the embodiments described hereinafter may be used in combination with automatic or manual rescaling methods. For example, the fixed size bar volume representation may be used until the volume reaches a preset value, such as "N" times the volume associated with the length of the fixed size bar, at which point a trader may be given the ability to resize the bars such that a new length of the bar will correspond to a higher value, for example. It should be understood that a trader could also resize the fixed size bars so that the length of the bar will correspond to a lower value.

While the present invention is described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the preferred embodiments are described in a software-based embodiment, which is executed on a computer device. As such, the preferred embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

FIG. 3 is a block diagram illustrating a client terminal 300 with a number of layers defining different stages that may be used to implement embodiments of the present invention. The client terminal 300 can be a computer, such as a workstation, desktop, handheld device, and so forth, that allow a trader to trade one or more tradeable objects that are offered at exchanges. The client terminal 300 includes a trading application 302, a volume display controller 304, and interfaces 306. The client terminal 300 may also include at least a processor and memory (both of which are not shown in the figure, but are well-known computer components). Preferably, the processor has enough processing power to handle and process various types of market information. The more market information is received and processed, the more processing power is preferred. However, any present day processor has enough capability to perform at least the most basic part of the present invention. Also, it should be understood that memory may include any computer readable medium. The term computer readable medium, as used herein, refers to any medium that participates in providing instructions to a processor unit for execution.

Preferably, the trading application 302 has access to market information through the interfaces 306, such as through an application programming interface ("API"), and the application 306 can also forward transaction information to the host exchange 308 via the API. In a preferred embodiment, when the trading application 302 receives market information from the exchange 308, it may arrange and display the received market information in many different ways, depending on how the trader prefers to view the information, on the visual output display devices 310. The display devices 310 could be a CRT-based video display, an LCD-based display, a gas plasma-panel display, a display that shows three-dimensional images, or a different display type. In the preferred embodiment, the trading application 302 creates specialized interactive screens that enable traders to, among other things, enter and execute orders, obtain market quotes, and monitor positions. The range and quality of features available to the trader on his or her trading screen may vary according to the specific software application being run. In addition to or in place of the interactive screens, the client terminal 102 could run automated types of trading applications. The trading application 302 may also receive input signals from traders via input devices 312. The input devices can include, for example, a mouse, a keyboard, or any other input means selected by a user.

The preferred embodiment may be implemented on any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIG. 1 could also be placed using any other trading application as well. Additionally, the preferred embodiments are not limited to any particular product that performs translation, storage, and display functions.

The volume display controller 304 is preferably a software application that interfaces with the trading application 302 to display and update traded volume or other user selected values at different price levels. The embodiments described hereinafter will be generally described in reference to the traded volume at price. However, it should be understood that different data types could be displayed using bar chart like displays that will be described in relation to subsequent figures. For example, the embodiments described hereinafter can be used to display statistical data, theoretical data, any calculated data, such as trader's profit/loss data, or any other market related data, such as market depth at different price levels. In a preferred embodiment, the volume display controller 304 uses a fixed scale chart, such as a bar chart including a plurality of fixed size bars displayed in relation to a plurality of price levels, the embodiments of which will be described in greater detail below. It should be understood that the volume display controller 304 may be configured to work with any type of trading display to provide the functionality described hereinafter.

III. Volume Representation Using Fixed Size Bars

The following are features of the preferred embodiments that provide specific functionalities to electronic trading. The functionalities include the ability to display quantity related information, such as traded volume, depth, or any other statistical, theoretical, or calculated values, using a fixed size scale as a reference. More specifically, the preferred embodiments provide a display that uses a fixed size bar chart that displays the selected value type. In one preferred embodiment, each bar may be, for example, progressively color-coded to display an increasing traded quantity. In such an embodiment, for example, if traded volume being displayed in relation to a specific price level reaches a value that is higher than a maximum quantity value corresponding to a fixed size bar, such bar may be progressively highlighted to display the quantity overflow. It should be understood that different graphical formats could be used to represent the overflow, example embodiments of which will be described in relation to subsequent figures.

Figure 4:
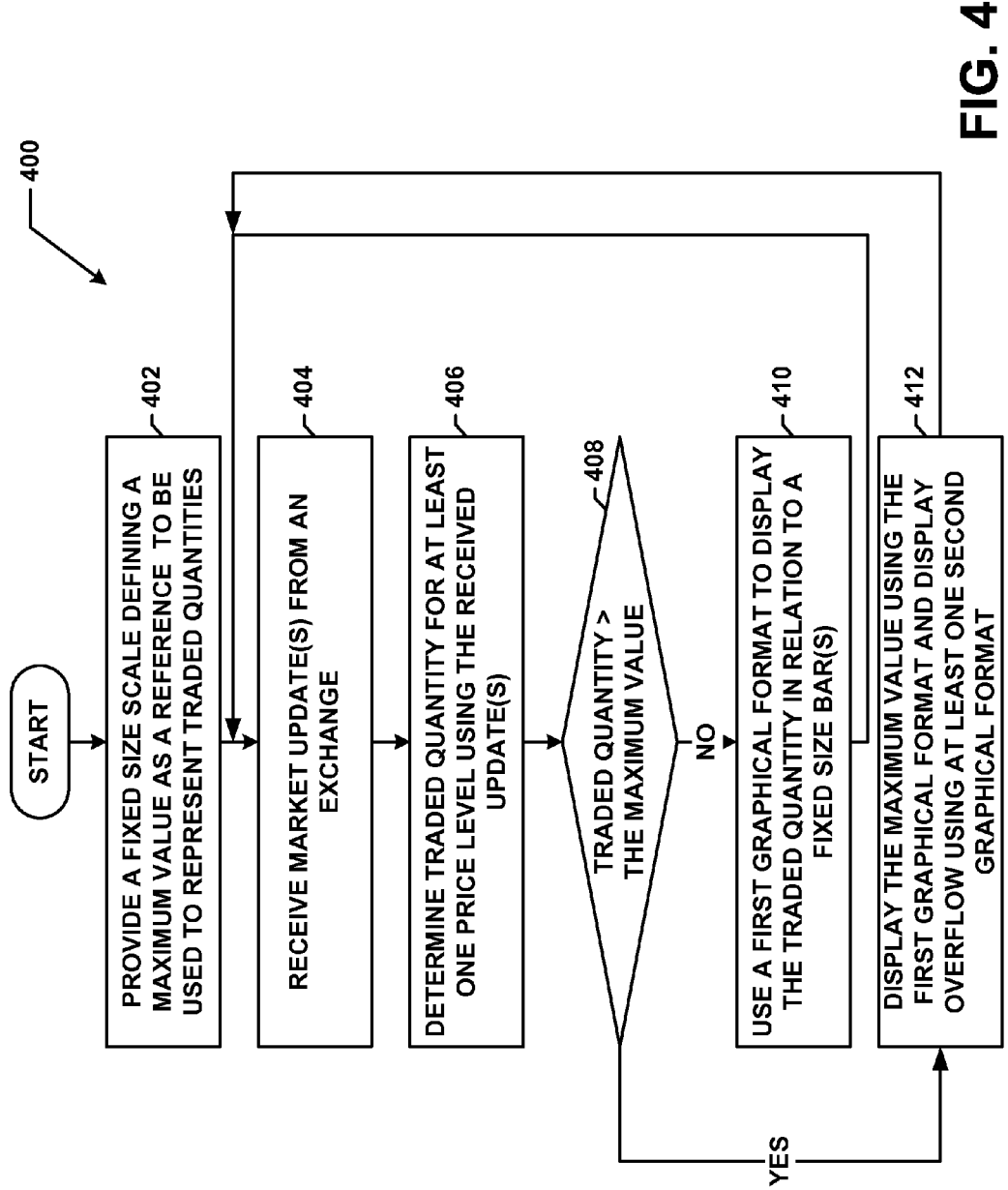
FIG. 4 a flowchart illustrating an example method for displaying user selected values, such as traded volume, using a fixed size bar chart according to one example embodiment.

FIG. 4 is a flowchart illustrating an example method for displaying values, such as traded volume, using a fixed size bar chart. The flowchart of FIG. 4 shows the functionality and operation of a possible implementation of the present embodiments. In this regard, each block may represent a module, a segment, or a portion of code, which includes one or more executable instructions for implementing specific logical functions or steps in the process. It should be understood that alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention. Also, the method 400 will be described in relation to the components illustrated in FIG. 3; however, it should be understood that different components could also be used to execute the method.

Referring to FIG. 4, at step 402, the volume display controller 304 may provide a fixed size scale to be used as a reference to represent a traded volume at a number of price levels. In the preferred embodiment, a maximum value on the fixed size scale may be used as a reference to define a length of each fixed size bar, such that the length of each bar corresponds to a predetermined maximum traded quantity. It should be understood that the maximum traded quantity corresponding to each bar may be user configurable. The steps of the method 400 will be described in reference to the traded volume; however, it should be understood that different data types could also be represented using the embodiments described herein. Some of the data types that can be displayed using the fixed size bars may include depth data, statistical data, theoretical data, or any other data types calculated based on updates being provided from an exchange or from any other source. Also, while the method for displaying traded volume is described in relation to fixed size bars, the method can be used in relation to different graphical representations, including, but not limited to, spirals forms, where a 360 degree movement around a portion of the spiral corresponds to a preset maximum value, for example, and the multiples of the 360 degrees may correspond to the multiples of the maximum value. Alternatively, circular band representations could be used, where each circular band corresponds to a maximum quantity value, for example.

At step 404, the trading application 302 receives a market update from an exchange. In one embodiment, the market update may be in a data structure format, and an exchange can send the data structures through a number of intermediate devices, such as gateways, for example. Generally, a data structure may include various market information, such as last traded quantity ("LTQ"), total traded quantity ("TTQ"), last traded price ("LTP"), pending bid/ask quantities at different price levels, and other market related or trader related information. It should be understood that exchanges can provide different data structures, and, depending on the exchange, the data structures may include different information.

At step 406, the trading application 302 determines a traded quantity value for at least one price level. Exchanges generally provide market updates using a variety of methods that may affect a method of calculating traded quantities. According to one method, for example, an exchange, such as Eurex, may provide periodic updates of market information to the connected client terminals. In such an embodiment, the exchange can provide updates at predetermined time intervals, and each update can reflect aggregate changes in the market that occurred during the predetermined time interval until the price change. According to another method, an exchange, such as Chicago Mercantile Exchange ("CME") may provide an update each time the market changes. For example, if three subsequent fills of 5, 5, and 12, are detected for the same price level, Eurex may provide three updates of 5, 10, and 22, at predetermined time intervals, while CME may provide three subsequent updates of 5, 5, and 12 once the respective fills are detected.

According to one example embodiment, if an exchange provides updates each time the market changes, the trading application 302 would receive an update including an LTQ and an LTP for each market change. In such embodiment, the trading application 302 could determine the traded volume for each price level by simply matching the received LTQ with specific price level, and then summing the traded quantities accordingly. If an exchange provides periodic updates corresponding to an aggregate traded quantity for the last traded price level, the trading application 302 may use the values in the received updates in addition to the TTQ to estimate traded quantities for each price level. For example, if the first update includes an LTQ of 10 at the price level of 100 and the TTQ of 110 (10@100, 110), and, if the next update includes (22@100, 122), the trading application 302 may simply add the quantities of 10 and then 12 to the traded volume value at the price level of 100. However, if the two updates include (22@ 100, 122) and (24@100, 153), the first look at the LTQ and LTP would suggest that the quantity of 2 has been traded at the price of 100 during the time between the two updates. However, using the TTQs from the two updates, the trading application 302 can determine that the quantity of 31 has been traded between the two updates. Therefore, based on the TTQ difference, the trading application 302 may determine that the market has moved away from the price level of 100 during the time between the two updates, and that the quantity of 7 has traded at some price level other than 100, before the quantity of 24 has been traded back at the LTP of 100. In such an embodiment, the trading application 302 may add the quantity of 7 to the traded quantities at the price levels of 101 or 99, depending on the system configuration. However, it should be understood that the trading application 302 could be configured to use different methods to distribute the quantity of 7 between one or more price levels. It should be understood that the embodiments described herein are not limited to any specific data formats in which data are to be received from an exchange, or to any algorithms to be used to calculate desired values using the received data.

In addition to determining traded volume for each price level, the trading application 302 may also attempt to distinguish whether the traded quantity was associated with a buy or a sell so that a trader can monitor the strength of the buying and/or selling activities. In one embodiment, the trading application 302 may determine whether a transaction corresponds to a buy or a sell using the LTP and the inside market information provided in a market update received from an exchange. For example, if the LTP specified in the received update is equal to or lower than the current bid, then, the trading application 302 may consider the LTQ as a sell, since one or more offers have matched the price level of the existing bid. Thus, if an offer has initiated the transaction, the traded quantity may be considered a sell. Similarly, if the LTP is equal to or higher than the current ask, then the traded application 302 may consider the corresponding LTQ to be a buy, since a bid has matched a pending offer. Thus, if a quantity has been traded at a price level equal to or higher than the best ask, the quantity may be added to the total buy volume at the respective price. Then, if a quantity has been traded at a price level equal to or lower than the best bid, the quantity may be added to the total sell volume at the price.

Referring back to FIG. 4, when the trading application 302 determines the traded quantity, such as the total traded volume or the total buy/sell volume, at step 408, the volume display controller 304 may determine if the calculated traded volume is higher than the maximum value corresponding to the fixed scale. If the traded volume is not higher than the maximum value, at 410, the volume display controller 304 may use the first graphical format to represent the calculated volume in relation to a fixed size bar associated with a price level at which the calculated volume has been traded, and the method 400 may continue at 404. In one embodiment, the fixed size bar may be color-coded to represent the level of the calculated value. However, different embodiments could also be used, such as using different types of indicators that move along the bar, or different highlighting formats.

Referring back to step 408, if the calculated volume is higher than the maximum value corresponding to the fixed scale, at step 412, the volume display controller 306 may first use the first graphical format to represent the maximum value in relation to a fixed size bar, and then may use a second graphical format in relation to the same bar to represent a quantity overflow (a difference between the calculated traded volume and the maximum value associated with the fixed size bar). In such an embodiment, for example, the entire bar may be color-coded using a first graphical format, and then a portion of the bar may be highlighted using another graphical format to represent the overflow. The same method using different graphical formats can be used to represent traded volume that crosses twice the maximum threshold. Therefore, using the method described above, each bar may represent any traded quantity including multiples of the maximum traded quantity without the need of rescaling the bars based on the maximum traded quantity, as in prior art systems. However, as mentioned earlier, the embodiments for displaying traded quantities using fixed size bars may be combined with providing to a trader the ability to rescale the bars, such as, for example, when the traded volume reaches a certain multiple of the maximum quantity volume corresponding to a bar.

The examples provided in relation to subsequent figures illustrate some features of the present embodiments. Description of these examples is provided for convenience only. Also, it should be understood that it is not intended for the invention to be limited to application in the illustrated graphical interfaces. After reading the following description of the examples, it will become apparent to a person skilled in the relevant art how to implement the invention in alternative trading screen environments.

Figure 5:
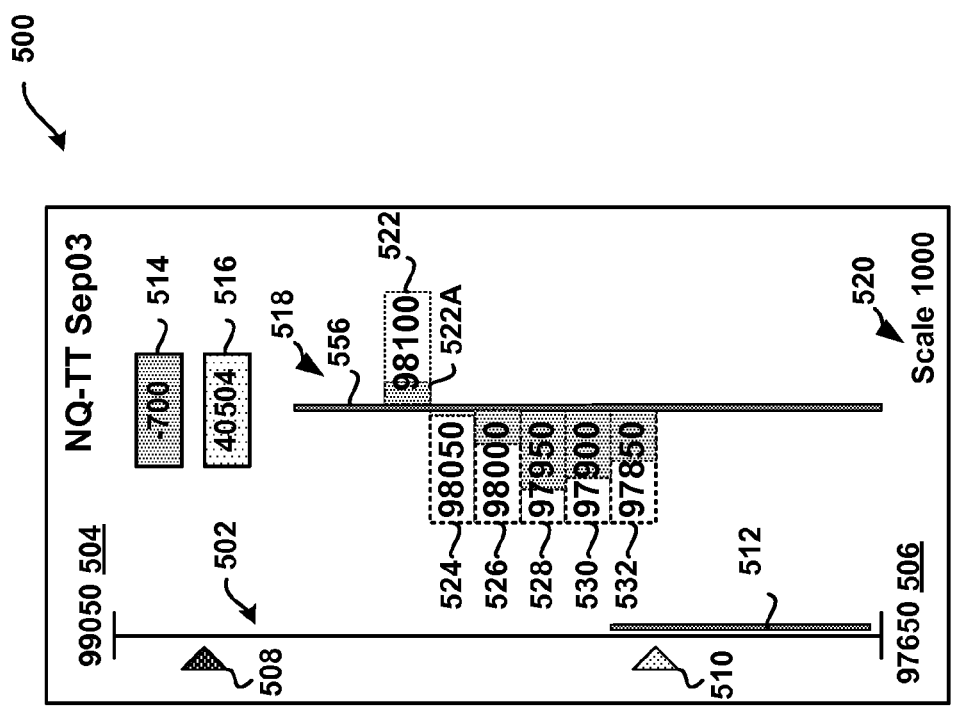
FIG. 5 is a block diagram illustrating a screen display in accordance with one preferred embodiment for displaying traded volume using fixed size bars.

FIG. 5 is a block diagram illustrating a screen display 500 in accordance with the preferred embodiments for displaying traded quantities using fixed size bars. In particular, the screen display 500 includes a first axis 502 illustrating a plurality of indicators associated with a wide range of user selectable information related to a tradeable object. More specifically, the axis 502 depicts the highest traded price of 99050 at 504, and the lowest traded price of 97650 at 506. Also, two indicators 508 and 510 are displayed in relation to the axis 502, and the indicators correspond to the opening price and the last traded price corresponding to a current trading session, respectively.

The display 500 also includes a bar-like indicator 512 displayed in relation to the axis 502. The indicator 512 illustrates a view of the display 518 that is scaled in relation to the maximum and minimum price levels 504 and 506. It should be understood that the extent of prices illustrated with the indicator 512 may depend on the type of host exchange providing market depth. For instance, some host exchanges provide market depth for all or many price levels, while some limit it to only a few price levels. In one preferred embodiment, the price range associated with the indicator 512 corresponds to the price range shown in relation to the bars depicted to the right of the indicator 512 that corresponds to the current market depth prices, for example. Thus, using such an embodiment, a trader can quickly view the current market position as compared to the highest and lowest prices during a trading day, or as compared to other user-selected prices during longer or shorter time intervals. It should be understood that the present invention is not limited to displaying traded volume in relation to prices corresponding to the current market depth prices, and traded volume values could be displayed in relation to more or fewer prices as well.

The display 500 also includes a display region 518 for displaying traded quantities using a plurality of fixed size bars 522-532. The fixed size bars 522-532 may be statically positioned in relation to a value axis 556, so that the bars don't change their positions until a repositioning command is detected, for example. In the embodiment illustrated in FIG. 5, each fixed size bar is associated with a single price level displayed within each bar, and the length of each bar corresponds to a value of 1000 predefined with a bar scale indicator 520. It should be understood that a trader could preferably change the scale to be used in relation to each bar by simply changing the value corresponding to the scale indicator 520. Also, while FIG. 5 illustrates prices displayed within each bar, it should be understood that different embodiments are possible as well. For example, only some rather than all prices can be displayed in relation to the bars, alternatively, no price levels could be displayed at all. Also, alternatively, each bar may correspond to more than one price level, such as two or more consolidated price levels, for example. Further, rather than associating each bar with a specific price level or consolidated price levels, each bar may be associated with a specific time or with a specific time interval during a trading session. In such an embodiment, each bar may display any numerical trader-related data, such as trader's profit/loss ("P/L") at different points during a trading session.

In the embodiment illustrated in FIG. 5, each bar is used to graphically display the traded volume at the price level corresponding to the bar. More specifically, at least a portion of each bar may be color-coded to represent the traded volume, such as illustrated at 522a in relation to the bar 522, for example. Also, as will be illustrated in relation to the subsequent figures, when the traded volume exceeds a maximum value predefined for a bar, the overflow volume could be represented using a different graphical format than the one used to represent the traded volume that was lower than the maximum value. For example, the overflow volume could be illustrated by shading the color-coded bar. However, it should be understood that a trader could configure different graphical formats to be used to represent the traded volume values.

Additionally, according to one example embodiment, a trader could use the interface 500 to submit orders to an exchange. For example, the interface 500 could display a number of quantity selectors corresponding to different quantity values that a trader could use to select a desired quantity level. In one embodiment, a trader could then select a price level for an order by simply clicking in relation to a bar corresponding to a desired price level. In such an embodiment, a right click of a mouse could correspond to a buy, while a left click could correspond to a sell. Also, orders may be submitted using order tickets that will allow a trader to define order parameters. However, it should be understood that different embodiments are possible as well.

Figure 6:
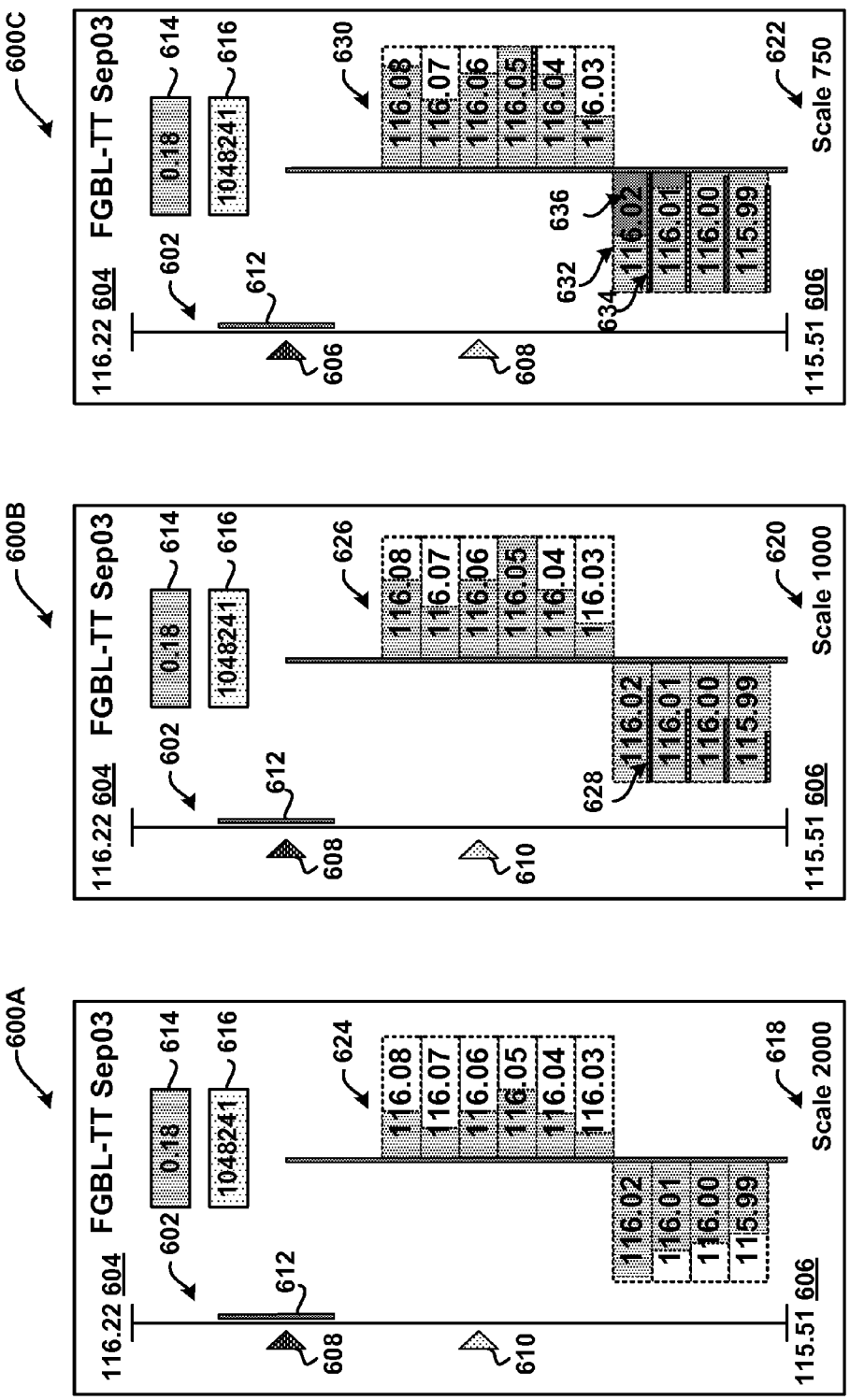
FIGS. 6A-6C are block diagrams illustrating three screen displays for displaying traded volume using fixed size bars based on different scales according to one example embodiment.

FIGS. 6A-6C are block diagrams illustrating screen displays 600A, 600B, and 600C for displaying traded quantities using fixed size bars based on three different scales. In particular, each display includes the features that have been described in reference to FIG. 5. Referring to FIGS. 6A-6C, the screen displays 600A-C include a first axis 602 defining the highest traded price of 116.22 at 604, the lowest traded price of 115.51 at 606, the opening price indicator 608, and the last traded price indicator 610. The displays also include a bar like indicator 612 illustrating a scaled range of prices displayed in relation to the display 624, an indicator 614 corresponding to a difference between the current last traded price compared to the last day's settlement price, and an indicator 616 displaying a total quantity that has been traded during a trading day.

Display regions 600A, 600B, and 600C are used to display the same traded volume related data using three different scales of 2000, 1000, and 750, respectively. As described in reference to FIG. 5, the three scales are used as a reference to display traded quantities in relation to the bars corresponding to each display region. Referring to FIG. 6A, the length of each bar corresponds to the quantity value of 2000, and each bar is color-coded to represent the quantity traded at the price level corresponding to each bar, with the quantity value at the price level of 116.02 being the closest one to 2000.

Referring now to FIG. 6B with a price scale now set to 1000, the quantities at the price levels of 116.02, 116.01, 116.00, and 115.99 now exceed the value of 1000 corresponding to the length of each bar set by the scale. Since the traded quantities at the four price levels exceed a maximum value to be represented with each bar, the overflow volume can be represented using a different graphical format. For example, referring to the bar corresponding to the price level of 116.02, the area corresponding to the bar may be color-coded using a first graphical format, and the overflow quantity may be represented by color-coding the bar using a second graphical format, such as illustrated at 628. It should be understood that color-coding, highlighting, or moving any other user-configured indicators in relation to each bar is not limited to any specific direction, and the direction of any movement could be user-configurable.

Similarly, referring to FIG. 6C, where the scale to be used in relation to the bars is set to 750, the order quantities at the price levels of 116.02 and 116.01 exceed a value corresponding to twice the length of the bars, i.e., 1500. As illustrated in reference to the bar at the price level of 116.02, for example, the traded quantity is represented using three graphical formats, a first graphical format 632 corresponding to the quantity range between 0-750, a second graphical format 634 corresponding to the quantity range between 751-1500, and a third graphical format 636 corresponding to the remaining quantity traded at that price.

While the example embodiments for representing traded quantities have been described in reference to FIGS. 5 and 6A-6C using bar chart format representation, different graphical representations could also be used to represent traded quantities or other user-selected values. For example, traded quantities or other trader-selected values could be represented using different shapes, such as circles or any other user-selected forms. Also, it should be understood that methods and graphical representations used for displaying overflow quantities could be user-configurable. For example, rather than color-coding each bar, a line moving across each bar could be used, while a format/color of the line may change, or different lines could be used, to represent a quantity that crosses every multiple of the maximum value associated with the bar. Alternatively, it should be understood that different user-configurable indicators could be used in relation to the fixed size bars as long as a trader can visually identify when a traded quantity is higher than a predetermined multiple of a maximum traded quantity corresponding to the length of each bar.

Figure 7:
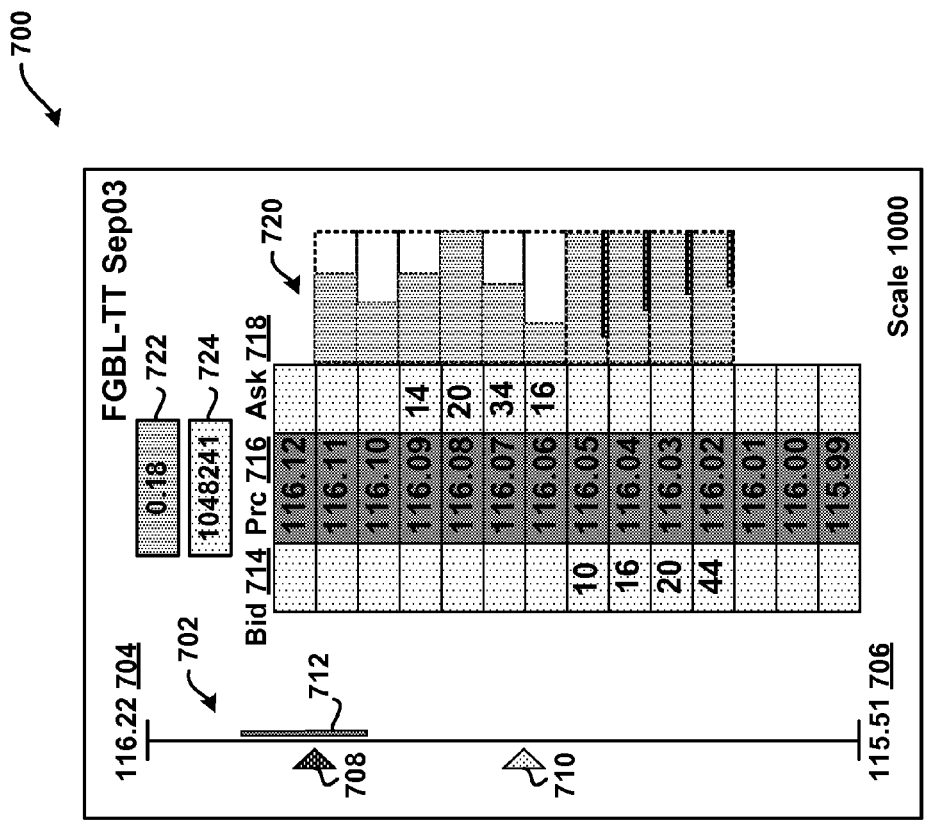
FIG. 7 is a block diagram illustrating another screen interface that can be used for displaying traded volume using fixed size bars and for trading according to one example embodiment.

FIG. 7 illustrates another screen display 700 that may be used for order entry and for displaying traded quantity related information in accordance with the preferred embodiments. Once again, the screen display 700 includes an axis 702 defining a rage of prices between the highest traded price of 116.22 at 704, and the lowest traded price of 115.51 at 706. Three indicators including a last traded price indicator 708, an opening price indicator 710, and an indicator 712 illustrating a scaled version of a price range displayed in the price column 716. However, it should be understood that the display 700 may be configured such that the axis 702 and the accompanying indicators are not displayed.

The display 700 also arranges the market information in an easy to read fashion by orienting the bid and ask quantities as shown at 714 and 718 along a common price axis 716. The representative prices for the given tradeable object are shown in a price column, where the prices are arranged in a numerical order in increments. It should be understood that prices may be of the static-type, such as when prices normally do not move until a repositioning command is received, or of the dynamic-type, such as when prices normally move. A display like the one shown in FIG. 7 also allows a trader to enter orders by selecting a price cell that is situated along the common price axis 716. More information related to placing orders using the display illustrated in FIG. 7 can be found in the application referenced above in relation to FIG. 3.

The display 700 also includes a plurality of fixed size bars 720 displayed in relation and corresponding to a plurality of price levels. More specifically, the bars in FIG. 7 are displayed in relation to the ask column 718; however, it should be understood that the bars could be displayed in relation to any axis. In the illustrated embodiment, the fixed size bars 720 are controlled using a scale of 1000; however, as described in relation to previous figures, different scales could also be used.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for displaying traded volume using fixed size bars in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method including:
    displaying by a computing device a fixed size bar, wherein the fixed size bar is a fixed size corresponding to a maximum value;
    receiving by the computing device a first value, wherein the first value is less than the maximum value;
    displaying by the computing device a first graphical indicator in relation to the fixed size bar, wherein the first graphical indicator represents the first value relative to the maximum value;
    receiving by the computing device a second value, wherein the second value is greater than the maximum value; and
    displaying by the computing device a second graphical indicator in relation to the fixed size bar, wherein the second graphical indicator represents an overflow of the second value over the maximum value.

2. The method of claim 1, wherein the first value and the second value are based on market data for a tradeable object.

3. The method of claim 2, wherein the first value and the second value are based on trade volume at a price level for the tradeable object.

4. The method of claim 1, wherein the first graphical indicator includes a first highlighting style and the second graphical indicator includes a second highlighting style.

5. The method of claim 1, wherein the first graphical indicator is positioned relative to a first side of the fixed size bar and the second graphical indicator is positioned relative to a second side of the fixed size bar, wherein the first side and the second side are at opposite ends of the fixed size bar.

6. The method of claim 1, wherein the maximum value is configurable.

7. The method of claim 1, wherein the fixed size bar is displayed in relation to a value on a value axis, wherein the first value and the second value are for data corresponding to the value on the value axis.

8. The method of claim 7, wherein the value axis is a price axis.

9. The method of claim 7, wherein the value axis is a static axis.

10. The method of claim 1, wherein the second value is less than or equal to two times the maximum value.

11. The method of claim 10, further including:
receiving by the computing device a third value, wherein the third value is greater than two times the maximum value; and
displaying by the computing device a third graphical indicator in relation to the fixed size bar, wherein the third graphical indicator represents an overflow of the third value over two times the maximum value.

12. A system including:
a computing device adapted to display a fixed size bar, wherein the fixed size bar is a fixed size corresponding to a maximum value;
the computing device adapted to receive a first value, wherein the first value is less than the maximum value;
the computing device adapted to display a first graphical indicator in relation to the fixed size bar, wherein the first graphical indicator represents the first value relative to the maximum value;
the computing device adapted to receive a second value, wherein the second value is greater than the maximum value; and
the computing device adapted to display a second graphical indicator in relation to the fixed size bar, wherein the second graphical indicator represents an overflow of the second value over the maximum value.

13. The system of claim 12, wherein the first value and the second value are based on market data for a tradeable object.

14. The system of claim 13, wherein the first value and the second value are based on trade volume at a price level for the tradeable object.

15. The system of claim 12, wherein the first graphical indicator includes a first highlighting style and the second graphical indicator includes a second highlighting style.

16. The system of claim 12, wherein the first graphical indicator is positioned relative to a first side of the fixed size bar and the second graphical indicator is positioned relative to a second side of the fixed size bar, wherein the first side and the second side are at opposite ends of the fixed size bar.

17. The system of claim 12, wherein the maximum value is configurable.

18. The system of claim 12, wherein the fixed size bar is displayed in relation to a value on a value axis, wherein the first value and the second value are for data corresponding to the value on the value axis.

19. The system of claim 18, wherein the value axis is a price axis.

20. The system of claim 18, wherein the value axis is a static axis.

21. The system of claim 12, wherein the second value is less than or equal to two times the maximum value.

22. The system of claim 21, further including:
the computing device adapted to receive a third value, wherein the third value is greater than two times the maximum value; and
the computing device adapted to display a third graphical indicator in relation to the fixed size bar, wherein the third graphical indicator represents an overflow of the third value over two times the maximum value.

23. A computer readable medium having stored therein instructions executable by a processor, wherein the instructions are executable to:
display a fixed size bar, wherein the fixed size bar is a fixed size corresponding to a maximum value;
receive a first value, wherein the first value is less than the maximum value;
display a first graphical indicator in relation to the fixed size bar, wherein the first graphical indicator represents the first value relative to the maximum value;
receive a second value, wherein the second value is greater than the maximum value; and
display a second graphical indicator in relation to the fixed size bar, wherein the second graphical indicator represents an overflow of the second value over the maximum value.

24. The computer readable medium of claim 23, wherein the first value and the second value are based on market data for a tradeable object.

25. The computer readable medium of claim 24, wherein the first value and the second value are based on trade volume at a price level for the tradeable object.

26. The computer readable medium of claim 23, wherein the first graphical indicator includes a first highlighting style and the second graphical indicator includes a second highlighting style.

27. The computer readable medium of claim 23, wherein the first graphical indicator is positioned relative to a first side of the fixed size bar and the second graphical indicator is positioned relative to a second side of the fixed size bar, wherein the first side and the second side are at opposite ends of the fixed size bar.

28. The computer readable medium of claim 23, wherein the maximum value is configurable.

29. The computer readable medium of claim 23, wherein the fixed size bar is displayed in relation to a value on a value axis, wherein the first value and the second value are for data corresponding to the value on the value axis.

30. The computer readable medium of claim 29, wherein the value axis is a price axis.

31. The computer readable medium of claim 29, wherein the value axis is a static axis.

32. The computer readable medium of claim 23, wherein the second value is less than or equal to two times the maximum value.

33. The computer readable medium of claim 32, wherein the instructions are further executable to:
receive a third value, wherein the third value is greater than two times the maximum value; and
display a third graphical indicator in relation to the fixed size bar, wherein the third graphical indicator represents an overflow of the third value over two times the maximum value.

* * * * *